United States Patent
Rocca

[19]
[11] Patent Number: 6,167,065
[45] Date of Patent: Dec. 26, 2000

[54] COMPACT DISCHARGE PUMPED SOFT X-RAY LASER

[75] Inventor: Jorge Rocca, Fort Collins, Colo.

[73] Assignee: Colorado State University Research Foundation, Fort Collins, Calif.

[21] Appl. No.: 09/194,990

[22] PCT Filed: Jun. 6, 1997

[86] PCT No.: PCT/US97/09948

§ 371 Date: Apr. 29, 1999

§ 102(e) Date: Apr. 29, 1999

[87] PCT Pub. No.: WO97/47062

PCT Pub. Date: Dec. 11, 1997

[51] Int. Cl.[7] .................................................. H01S 3/30
[52] U.S. Cl. .................................. 372/5; 372/37; 372/39; 372/76; 372/81; 372/86
[58] Field of Search .................................. 372/5, 37, 39, 372/76, 84, 86

[56] References Cited

U.S. PATENT DOCUMENTS

| | | | |
|---|---|---|---|
| 4,660,203 | 4/1987 | Hagelstein | 372/5 |
| 4,937,832 | 6/1990 | Rocca | 372/5 |
| 4,977,572 | 12/1990 | Nilsen | 372/5 |
| 5,048,045 | 9/1991 | Noda et al. | 372/5 |
| 5,317,574 | 5/1994 | Wang | 372/5 |

Primary Examiner—Leon Scott, Jr.
Attorney, Agent, or Firm—Sheridan & Ross P.C.

[57] ABSTRACT

An extremely compact soft x-ray and/or extreme ultraviolet laser is disclosed that can be repetitively fired within short time intervals. The laser generates a plasma within a capillary (3) by flowing through the capillary (3) a fast high current pulse generated by a very compact liquid dielectric (1) transmission line (9) geometry.

20 Claims, 3 Drawing Sheets

COMPACT DISCHARGE PUMPED SOFT X-RAY LASER

FIELD OF THE INVENTION

The present invention relates generally to a compact, efficient soft x-ray laser by direct discharge excitation of capillary channels with fast current pulses.

BACKGROUND OF THE INVENTION

Many technological and scientific application can benefit from compact sources of soft x-ray and/or extreme ultraviolet laser radiation. Such radiation is made of energetic quanta (photons) having an energy much larger than that of visible light quanta. Consequently, it can interact with matter in different ways than visible or ultraviolet light, therefore inducing reactions or recording features that would not be possible with longer wavelength radiation.

A few technologies have been developed to produce such beams of soft x-ray and/or extreme ultraviolet radiation. They include synchrotron sources and soft x-ray lasers. These devices are, however, expensive and very large in size and complex. These limitations put those powerful sources out of the reach of most individual and small user groups.

Soft x-ray lasers operating at wavelengths of less than 500 Angstroms have currently been demonstrated by: (a) the use of lasers delivering the pulse energies of kilojoules or hundred of joules, most typically Nd-Glass lasers, to create highly ionized plasmas from solid targets such as Selenium and (b) the use of very short (,100 ps) or ultrashort (0.03–2 ps) laser pulses with smaller energy and size than those mentioned above, but with typically Terawatt peak power.

It should also be noted that x-ray laser radiation from laser created plasmas has been generated by either one of the following two types of excitation processes.

(i) Electron Impact Excitation

In this case energetic electrons from laser created plasmas collide with ions of a certain charge state and excite these ions to create a population inversion between two excited levels of this specie. What follows as a result is common to the operation of most other lasers: the process of stimulated emission causes the radiation corresponding to the wavelength of the radiative transition that links the two levels to amplify in intensity as it travels through the medium.

(ii) Electron Ion Recombination

A laser created plasma rapidly cools at the end of the excitation pulse by adiabatic expansion, radiation or electron heat conduction. The rapid decrease in the plasma temperature causes the electrons and ions from the plasma to recombine, creating population inversion between excited levels of the lesser charge ions that result from the recombination process. Again radiation with a photon energy corresponding to the energy difference between the inverted levels is amplified.

An important aspect of the difficulty in constructing x-ray lasers is the requirement of a powerful energy source capable of depositing very high power densities. In all the methods described above a laser is typically used as such an energy source. Higher power density deposition of lasing material is achieved by focussing the laser beams with lenses or mirrors and hence they are used to generate plasmas that are used in the ways described above to produce the amplification of soft x-ray or extreme ultraviolet radiation.

In the particular case of soft x-ray lasers, they are traditionally generated utilizing very large power infrared, visible or ultraviolet lasers to generate the medium that will produce the soft x-ray beam. In this method of generating soft x-ray/extreme ultraviolet laser radiation, electricity is used to excite a laser emitting infrared, visible or ultraviolet light. This laser beam is then used as the energy source to excite the soft x-ray/extreme ultraviolet laser. These soft x-ray lasers are not only very costly and complex, but also in some cases can only produce laser pulses at rates of a few times per hour. Many applications require the development of soft x-ray and extreme ultraviolet lasers that are simple to operate, small in size, affordable, and that can be fired repetitively.

SUMMARY OF THE INVENTION

The present invention relates to a method and apparatus for producing a soft x-ray laser based in a capillary discharge. In this scheme, a fast current pulse is injected into a capillary channel to generate a plasma column with a large length to diameter ratio having adequate conditions for producing an intense soft x-ray and/or extreme ultraviolet laser beam. The plasma can be generated by either injecting material in gaseous or vapor form in the capillary channel, or by ablating material from the capillary walls. The necessary excitation for lasing at soft x-ray and/or extreme ultraviolet wavelengths can be produced, among other methods, by collisional electron impact excitation, or by electron-ion recombination. In the first case, neon-like or nickel-like ions can be generated and used as an amplification medium. One of the present inventors first demonstrated such discharge pumped soft x-ray (or extreme ultraviolet laser) using a fast current pulse to excite argon gas injected into such capillary channels. Argon was ionized to the neon-like state by the current pulse and lasing was achieved at 46.9 nm by collisional electron excitation of the laser upper level. This laser produces a beam of quanta having an individual energy of about 10 times larger than visible light. In the first implementation of this concept, the device used to produce the current pulse was a liquid dielectric capacitor, and had an overall dimension that was 1 meter by 1 meter by more than 2.5 meters. It was used to produce laser pulses at a rate of about one per minute.

The present invention relates to a very compact, high power transmission line circuit configuration for the excitation of such laser, that in combination with other disclosed means, allow the creation of an extremely compact discharge, pumped soft x-ray or extreme ultraviolet laser that can be fired repetitively. The herein disclosed discharge pumped soft x-ray/extreme ultraviolet laser is not only extremely compact but also has a simplified operation and produces intense beams of ultra-short wavelength radiation for numerous applications. Those skilled in this art will appreciate the advantages of increased simplicity laser pumping methods, reduced size and a lower construction cost of such device.

One aspect of the present invention is directed to an electrically powered apparatus for the generation of soft x-ray/extreme ultraviolet laser radiation, such apparatus comprising an excitation circuit having at least one transmission line comprising two or more electrically conducting structures separated by a liquid dielectric for providing a fast high current excitation pulse through a capillary structure. The excitation circuit of the present invention is capable of generating an elongated plasma column of small diameter to produce a population inversion. The capillary structure preferably has a large length-to-diameter ratio enclosing a selected lasing material. The capillary structure comprises at least two electrodes, with at least one of such electrodes having a hole to allow the exit of laser radiation. A means to pre-ionize the selected lasing material in the capillary structure is provided, such pre-ionization taking place prior to the arrival of a fast current excitation pulse traveling through the capillary structure. A power source is provided to apply a high voltage to one or more of the electrically conducting structures. A fast electrical switch connects the electrically conducting structures, thereby generating a high voltage drop across the capillary structure to achieve a high current pulse through the capillary structure.

In a preferred embodiment, an electrical circuit is included to prevent any current significant pulse, except for the fast current excitation pulse and the pre-ionization pulse, from flowing through the capillary structure.

Other optional embodiments to enhance performance include a reflecting mirror aligned with the axis of the capillary structure to allow a multiple pass of radiation through the capillary structure. Yet another embodiment includes the use of a means for producing an axial magnetic field, such as an electromagnet, positioned around the capillary structure.

BRIEF DESCRIPTION OF THE DRAWINGS

FIG. 3 also shows the time when the lasing occurs during the current pulse.

DETAILED DESCRIPTION OF THE INVENTION

Figure 1:
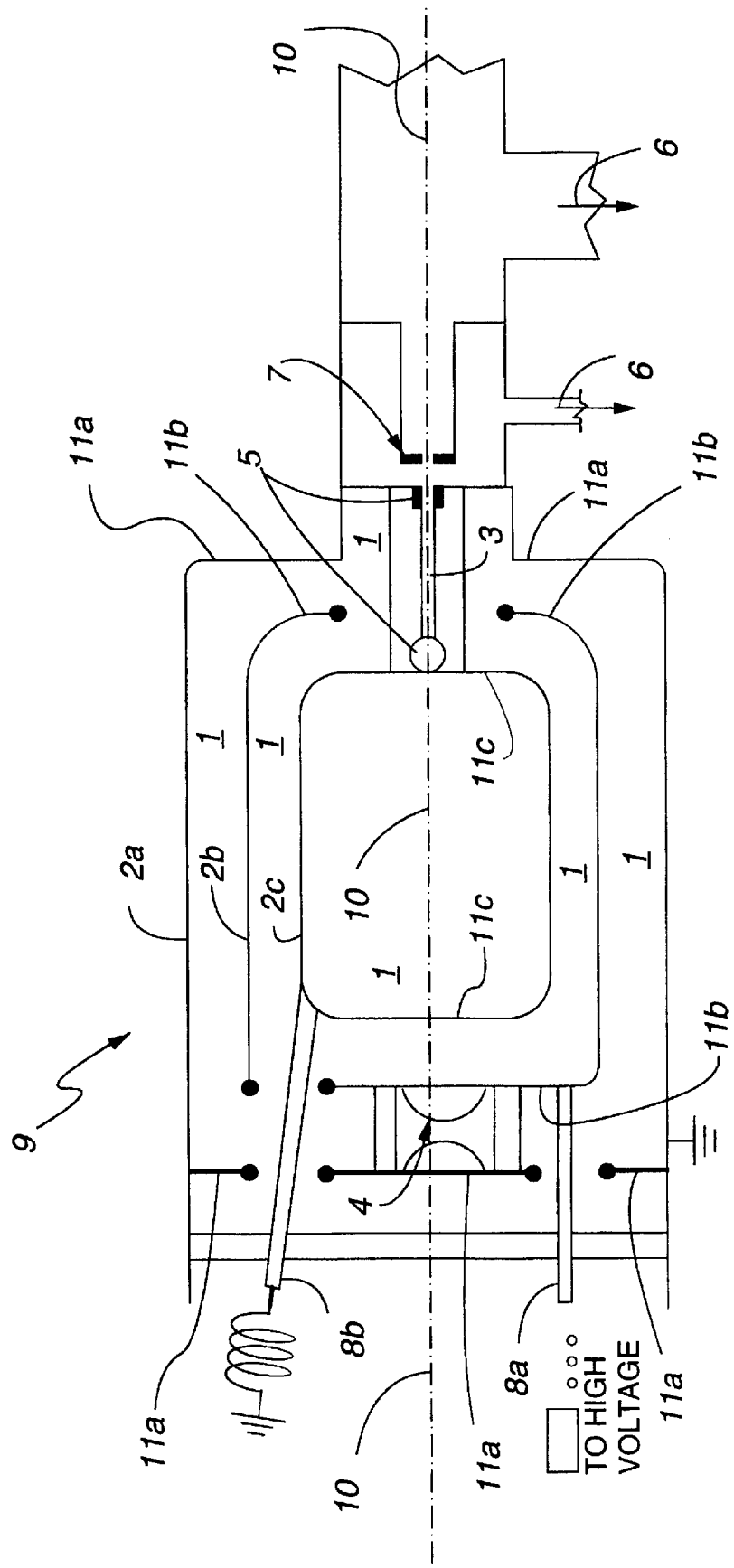
FIG. 1 shows a simplified diagram of a cross-section of discharge excited laser of the present invention.

The following are definitions of terms used in the Detailed Description hereinafter:

(a) excitation circuit: an electrical circuit and/or electrical power source necessary for the generation of plasma and the generation of a population inversio;

(b) transmission line: a structure for the propagation and/or generation of electromagnetic waves; in one embodiment such a transmission line may include two or more cylindrical tubes, or equivalent structures, or plates separated by a liquid dielectric with feed tubes or plates, that is, such a transmission line has at least two electrically conducting structures as discussed immediately below;

(c) electrically conducting structure: the cylindrical tubes or their equivalents in a transmission line;

(d) liquid dielectric: in at least some embodiments this term may be interpreted as water or oil or ethylene glycol;

(e) fast high current excitation pulse: a current having a pulse width in the range of 1 to 500 ns with 0.5 to 500 kiloamps; more preferably this term refers to current having a pulse width in the range of 20 to 100 ns;

(f) capillary structure: a solid volume with a hole or channel through it, the channel also hereinafter denoted a capillary. The capillary structure may be composed of plastic for low rates of lasing (e.g., less than approximately 1 lasing per 5 seconds). However, for more frequent lasing, the capillary structure may include a more durable material surrounding the capillary such as a ceramic material or other durable insulating material. For example, the following insulating materials may be used: aluminum oxide, aluminum nitride, sapphire, silicon nitride, and silicon carbide, since these materials have a high heat conductivity, high decomposition temperature, and are electrically insulating;

(g) a population inversion: a positive population difference between the upper and lower levels of a laser transition;

(h) characteristics of electrodes: this term includes a composition of electrode materials such as in some embodiments of molybdenum; stainless steel and tungsten; this term also includes various shapes of electrodes such as hollow cylinders, planar or convex surfaces;

(i) means to pre-ionize: any means to create a concentration of electrons and ions within the capillary structure prior to the arrival of the high current excitation pulse;

(j) arrival of a fast current excitation pulse: this term may be defined as the arrival of a high current pulse to one of the two or more electrodes placed at the end of the capillary structures after the high voltage transmission lines are charged by the power source and a spark gap switch connecting two or more of the capillary structures is closed;

(k) fast (electrical) switch: a device connecting two electrically conducting structures to allow the flow of current therebetween wherein in at least one embodiment the electrically conductive structures are separated by a dielectric that upon breaking down allows the electrical current to flow between the conductive structures; such an electrical switch compatible with the generation of the previously mentioned current pulse has a pulse width in the range of 1 to 500 ns;

(l) power source: in one embodiment this term is a device for pulse charging a transmission line wherein the pulse is generated by one or more capacitors that are charged in parallel and subsequently switched in series to achieve voltage multiplication such as is performed by a MARX generator; additionally, a power source herein may be a pulse high voltage transformer, or an inductive storage device;

(m) high voltage drop: this term denotes a voltage drop of 2 kilovolts to 2 megavolts; more preferably, a voltage drop of 10 kilovolts to 1000 kilovolts.

The apparatus and method for producing the necessary current pulse and subsequent laser action described herein overcomes the barriers and limitations that have precluded the widespread use of soft x-ray (e.g., below about 500 Angstroms)/extreme ultraviolet (e.g., below about 1,000 Angstroms) lasers in applications. It generates powerful beams of soft x-ray and/or extreme ultraviolet laser radiation with an extremely compact set-up of significantly reduced dimensions, that is directly excited by electrical current and that may be fired at a repetition rate up to 100 times per second.

Fast discharges through a capillary, that is to say through a capillary tube-like configuration (denoted also hereinafter as "capillary geometry"), having a large length-to-diameter ratio has certain fundamental properties which are ideally suited to generate plasmas that can be used to amplify soft x-ray and/or extreme ultraviolet laser radiation (e.g., radiation having wavelengths between about 50 and 1,000 Angstroms). In such a capillary geometry, highly ionized plasmas can be created with modest excitation energy. Preferably the capillary will comprise a tube-like structure whose length is from about 20 to about 1,000 times the diameter of the capillary tube-like structure. In the most preferred capillary geometries, the length of the capillary tube will be from about 20 to about 100 times the diameter of the capillary. Capillary diameters of from about 1 millimeter to about 8 millimeters are preferred and capillary diameters of about 2 to about 6 millimeters are most preferred. The energy from a high voltage transmission line (i.e., a transmission line, having a voltage of 2 kilovolts to 2 megavolts and having an impedance in the range of 0.1 to 50 ohms is discharged through the capillary and thereby produces a plasma by ionizing material which is introduced in the capillary in the form of a gas or a vapor. As an alternative, note that the material might be produced by ablation of the capillary walls and/or a capacitor may replace the high voltage transmission line for generating the appropriate discharge into the capillary.

In any case, a low inductance circuit configuration is used to allow for the high power energy transfer to the capillary. During discharge of a current pulse causing the energy transfer, an intense self generated magnetic field confines and compresses the plasma and assists in achieving a high degree of ionization. The resulting small diameter of the resulting compressed capillary plasma allows for avoidance of trapping of lower laser level radiation by resonant absorption in the radial direction. Hence, the laser's lower levels can be depopulated by radiative decay.

An axial magnetic field (i.e., having magnetic flux extending longitudinally along the length of the capillary) can be employed to control the plasma compression.

The preferred excitation mechanism by which laser radiation can be produced in this compact capillary discharge laser is collisional electron excitation of the laser upper level. Preferred ions in which lasing can be produced by this mechanism include neon-like and nickel-like ions. By this mechanism, electrons of sufficient energy collide with ground state ions of the selected ion species and thereby excite them to the laser upper level. For example, if argon is introduced into the capillary, the current pulse will first ionize argon to the neon-like state. Subsequently, energetic electrons will excite by electron impact the neon-like ground state ions to the laser upper level, producing, for example, a gain in the 46.9 nm line of neon-like argon.

Alternatively, population inversions created by collisional electronic ion-recombination may allow laser amplification. In this case a highly ionized plasma is first produced and then allowed to rapidly cool. Cooling mechanisms can include rapid adiabatic expansion, heat conduction and radiation. In this case, the preferred lasing species are hydrogen-like, lithium-like and sodium-like ions. For this purpose, the fast high current excitation pulse has to first create large densities of totally stripped, helium-like, or neon-like ions, respectively.

The present invention has a combination of advantages that make it unique among known soft x-ray/extreme ultraviolet laser sources; that is:

(1) It is extremely small. The new laser itself, excluding the power supply, has a dimension of only about 0.4 m by 0.4 m by about 1 m. This small volume is an important feature, as it allows the present invention to be placed on top of a small table. Such small size and "table-top" foot-print allows it to be easily transported and positioned near an application.

(2) It can be operated repetitively, producing laser pulses at a rate of one or many (typically 0.1 to 100) times per second.

(3) It is directly excited by electrical current, not requiring another laser as the energy source, as is prevalent in the art. This results in a simpler setup and more efficient and less costly operation.

(4) It is simple to operate. A single operator can operate the device of the present invention.

The compact laser of the present invention utilizes a liquid dielectric, e.g., water, ethylene glycol, alcohol or oil having a high dielectric constant (with water or ethylene glycol being preferred) as part of the transmission line that can be described as a Blumlein configuration or a modified Blumlein configuration. Such a transmission line is pulse charged and subsequently very rapidly discharged by means of a fast electrical switch through a capillary to produce a fast high current excitation pulse, having a pulse width of 1 ns to 1000 ns, with preferred values between 10 and 300 ns. The capillary structure (containing the capillary) is made of a dielectric material such as a plastic or ceramic, and has a capillary diameter between 0.5 and 15 mm, with diameters between 1 and 8 mm preferred, and between 2 and 6 mm most preferred. The length of the capillary is between 3 and 50 cm, with preferred lengths between 5 and 20 cm. In operation, the capillary is evacuated and subsequently filled with the selected gas or vapor, and this gas or vapor is pre-ionized prior to the arrival of the fast high current excitation pulse. Thus, the pre-ionization allows for the generation of an axially uniform plasma density within the capillary. Subsequently, the fast high current excitation pulse rapidly ionizes and compresses the plasma within the capillary creating a narrow and long plasma volume in the capillary so that the required conditions for soft x-ray and/or extreme ultraviolet lasing are created.

In one embodiment of the present invention, the capillary may be filled with argon gas and neon-like argon ions are generated and excited by the fast high excitation pulse to the 3p J=0 level, as one skilled in the art will understand. In an alternative embodiment, soft x-ray extreme ultraviolet lasing may be induced by electron impact excitation of other neon-like or nickel-like ions within the capillary. Also, lasing amplification by the generation via population inversion created following electron ion recombination may also be utilized in another embodiment of the invention.

While various embodiments of the present invention are possible, at least some of the features included in most embodiments are:

(1) One or more transmission lines having co-axial concentric conductive tubes and/or parallel, contoured conducting plates, separated by dielectric fluids (with water or ethylene glycol as preferred fluids). Preferably two transmission lines made of three conducting concentric tubes or parallel plates are used.

(2) A capillary load indirectly or directly connected across two of the conducting tubes/plates (preferably the inner and outer).

(3) Means to charge the transmission lines by connecting one of the tube/plate to high voltage, for example, by means of a Marx generator.

(4) One or more fast switches, (such as a gas controlled spark-gap) capable of switching (i.e., electrically connecting) one tube/plate to another of the tubes/plates for generating the fast high excitation current pulses. This rapidly builds a voltage difference across the capillary load, generating a fast high current excitation pulse through the capillary.

(5) Means to evacuate and fill the capillary volume with the desired gas or vapor prior to the arrival of the fast high current excitation pulse.

(6) Means to pre-ionize the volume of material contained within the capillary channel prior to the arrival of the fast high current excitation pulse.

(7) Means to stop any other undesired current pulse aside from the pre-ionization pulse and main fast high current excitation pulse from flowing through the capillary.

One or more capillary structures used with the present invention are most preferably made of an electrical insulating material specifically selected for the generation of a plasma. Electrodes used with the present invention can be made of any suitable electrical conducting material and may include holes at or near the axis of such electrodes to allow exit of laser radiation. The power source suitable for use with the present invention can be a low inductance capacitor bank or an electrical transmission line having a low impedance. Half cavities, made using a single mirror, or optical resonators can be utilized to enhance the amplification of short wavelength radiation from the plasma within the channel. A mirror and a partially reflected beam splitter can be used in one possible implementation of an optical resonator.

One of skill in the art will appreciate that many configurations of the present invention are possible which would be within the scope of the present disclosure and claims. In some embodiments, a magnetic field producing means such as an electromagnet can be positioned surrounding the capillary to produce a high intensity magnetic field. The magnetic field is produced by discharging a capacitor bank through a triggered spark gap or by simply flowing CD current. Moreover, transmission lines, in some embodiments, can be replaced by a bank of low inductance capacitors.

A further understanding of the herein disclosed method and apparatus for the generation of soft x-ray and extreme ultraviolet radiation (e.g., radiation with wavelength between 50 and 1000 Angstroms) can be gained by reference to FIG. 1.

FIG. 1 shows a simplified diagram of a cross section of the discharge excited laser used in a successful prototype implemented in the laboratory. In this design, the laser is powered by a transmission line 9 that has in its central part a cylindrical geometry that is a combination of cylindrical tubes 2a, 2b and 2c that are concentric about a center axis 10 and have end disks 11a, 11b and 11c, respectively. Moreover, the space between the tubes 2a, 2b and 2c is substantially filled with a liquid (water or ethylene glycol preferred) dielectric 1. The three concentric tubes 2a, 2b and 2c are made of metal such as stainless steel, brass or copper so that these tubes form a transmission line that is configured as a Blumlein or modified Blumlein configuration (collectively referred to by the label 2 hereinafter). Note that the outer tube 2a is also used to contain the liquid dielectric 1 of the transmission line 9. Also note that the elements 8a and 8b are electrical connections linking the transmission line to the high voltage power supply (8a) used to charge the transmission line and to ground (8b). The capillary 3 is preferably partially embedded in the transmission line 9 to help reduce the inductance. Thus, the capillary 3 is surrounded by the liquid dielectric 1. The outside conducting tube 2a is kept at ground potential. The middle conducting tube 2b is first charged to a high voltage (e.g., 0.5 to 500 kiloamps) by means of a high voltage power source (not shown) and is subsequently switched to ground by one or more fast spark-gap switches 4. The charging circuit used in conjunction with the high voltage power source is also not shown in FIG. 1. However, both are symbolically indicated by the label "high voltage". Note that the switch can be implemented utilizing a gas-filled spark-gap. Accordingly, in such an implementation, when the spark-gap breaks (as one skilled in the art will understand), the inner tube 2c is elevated to a high voltage and a big voltage difference (e.g., a difference within the range of 2 kilovolts to 10 megavolts) builds across the capillary 3, which is connected between the inner and outer by means of two electrodes 5. This voltage difference causes a fast high current excitation pulse to flow through the capillary 3. Not shown in the diagram for simplicity are means to pre-ionize the discharge and to stop undesired current pre-pulses.

Following the excitation by this fast high current excitation pulse, the plasma volume compresses and creates a large number of ions of the selected species excited to the laser upper level by collisional electron impact excitation. This generates a population inversion between the upper and the lower level of the laser transition. The spontaneous emission of the laser transition is amplified and a high intensity laser beam is formed as the radiation propagates through the capillary. A low pressure is maintained by means of vacuum pumps 6 and selected pinholes 7 at the exit of the device to avoid absorption of the laser radiation by residual gas or vapor.

Those skilled in the art will notice that several variations of this transmission line geometry are possible. For example, the switch can be placed between the middle tube and the inner tube. In any case, a fast high current pulse is produced at the capillary when the switch breaks. Also, the transmission line can be implemented with three parallel plates rather than three concentric cylinders. In another variation, the number of transmission lines can be larger than the two lines conformed by the three concentric tubes. Also as mentioned above, a half-optical cavity or a full optical resonator, constituted by one or more reflecting surfaces, could be added to enhance the energy and intensity of the laser.

The electrodes are preferably provided with protrusions which protrude into the capillary structure in order that electrical breakdown occurs through the capillary and flashover is avoided in external surfaces. This can also be encouraged by making the distance that separates the electrodes through the capillary much shorter than any other external path the might connect the two electrodes. External flashover is also avoided by the liquid dielectric that surrounds the capillary.

The following experimental results are provided for purposes of illustration and are not intended to limit the scope of the invention.

EXAMPLES

Figure 2:
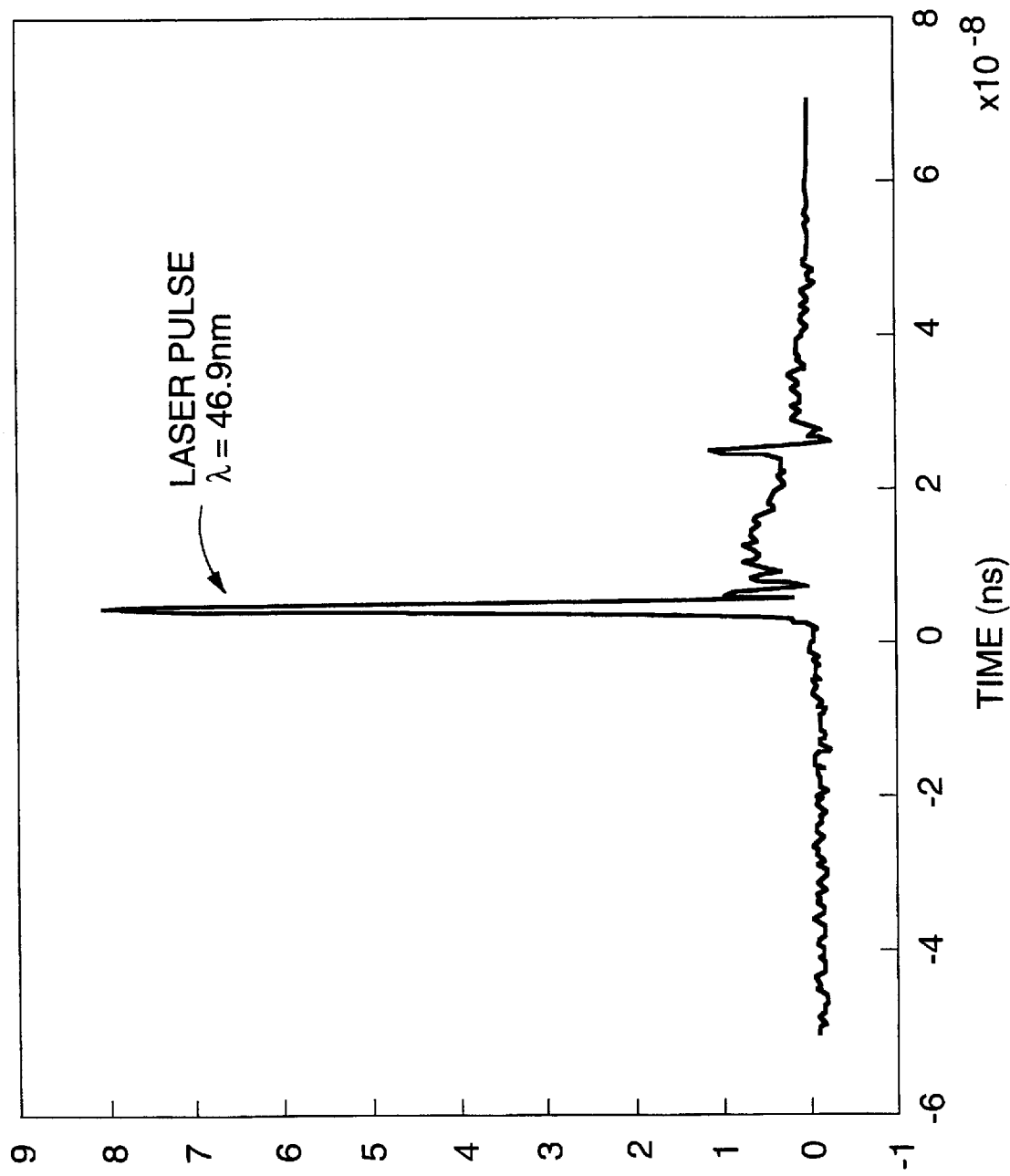
FIG. 2 is a graph showing results from a laser pulse generated using a capillary having a diameter of 4 mm and being 12.6 cm long, illustrating the recording of a laser pulse with a vacuum photodiode.
Figure 3:
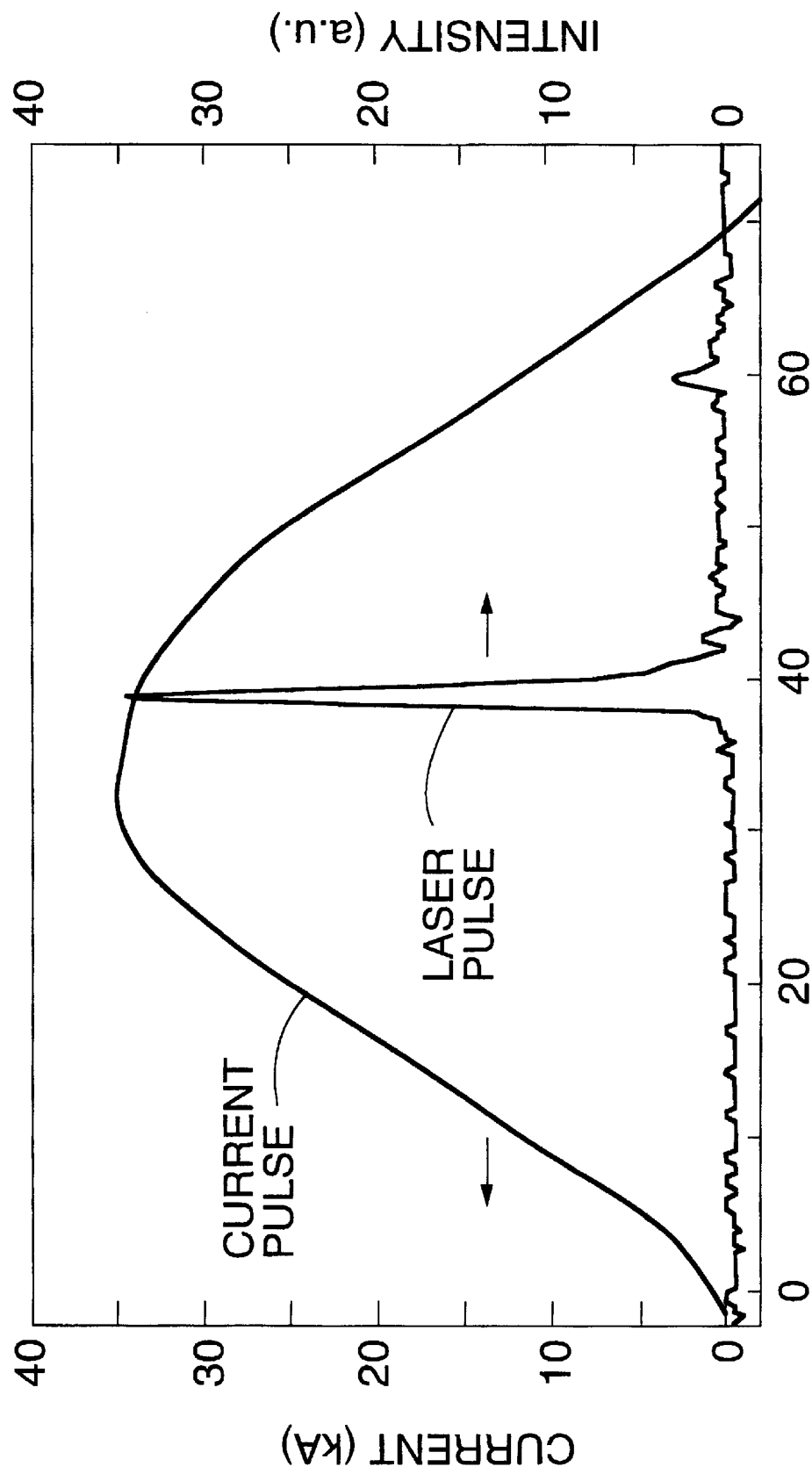
FIG. 3 is a graph showing the current pulse used to obtain the laser pulse also shown in this figure.

In one embodiment of the present invention, a graph of the laser output from a very compact "table-top" x-ray laser based on the scheme described herein is shown in FIG. 2. That is, FIG. 2 is a recording of the shortwavelength radiation emitted by an argon capillary plasma excited by a 38 kA current pulse. The signal was recorded with a vacuum photodiode placed at about 140 cm from the exit of the capillary 3. The narrow and intense peak in FIG. 2 and FIG. 3 is the laser pulse, having a wavelength of 469 A. It corresponds to the J=0-1 line between the 3p–3s levels of neon-like argon. The laser pulse has a pulsewidth of about 1 ns. The demonstration was conducted in a polyacetal capillary 4 mm in diameter and 12.6 cm in length filled with about 0.5 to 0.7 Tors of argon gas. The laser pulse is observed to precede by about 7–8 ns a radiation pulse corresponding to spontaneous emission emitted by the plasma at the time of stagnation.

While various embodiments of the present invention have been described in detail, it is apparent that modifications and adaptations of those embodiments will occur to those skilled in the art. It is to be expressly understood, however, that such modifications and adaptations are within the scope of the present invention, as set forth in the following claims.

What is claimed is:

1. An electrically powered apparatus for the generation of soft x-ray/extreme ultraviolet laser radiation, said apparatus comprising:
   (a) an excitation circuit having at least one transmission line comprising two or more electrically conducting structures separated by a liquid dielectric for providing a fast high current excitation pulse having a pulse width in the range of 1 nanosecond to 500 nanoseconds with 0.5 to 500 kiloamps;
   (b) a capillary structure having a capillary with a length to diameter ratio of 20 to 1000 for enclosing a selected lasing material, said excitation circuit being capable of generating a plasma volume within said capillary to produce a population inversion wherein said capillary structure contacts at least two electrodes;
   (c) a means to pre-ionize said selected lasing material in said capillary prior to the arrival of said fast high current excitation pulse;
   (d) a power source to apply a voltage of 2 kilovolts to 2 megavolts to one or more of said electrically conducting structures; and
   (e) a fast electrical switch for generating said fast high current excitation pulse having pulse width in a range of 1 ns to 500 ns for connecting said electrically conducting structures, thereby generating a high voltage drop across said capillary to achieve a high current pulse through said capillary.

2. The apparatus as claimed in claim 1, wherein said at least one transmission line is configured as one of: a Blumlein and a modified Blumlein configuration.

3. The apparatus as claimed in claim 1, wherein said at least one transmission line includes three of said electrically conducting structures which are concentrically related.

4. The apparatus as claimed in claim 1 wherein said capillary structure is at least partially made of a ceramic material.

5. The apparatus as claimed in claim 1 wherein said capillary structure is at least partially made of material from the group consisting of aluminum oxide, aluminum nitride, sapphire, silicon nitride, and silicon carbide.

6. The apparatus as claimed in claim 1 wherein said electrical circuit further prevents any current pulse except: (a) said fast high current excitation pulse, and (b) any pre-ionization pulse from said means to pre-ionize from flowing through said capillary.

7. The apparatus as claimed in claim 1 further comprising a reflecting mirror aligned with a longitudinal axis of said capillary to allow multiple passes of the radiation through said capillary structure.

8. The apparatus as claimed in claim 1 further comprising a means for producing an axial magnetic field around said capillary.

9. A method of generating soft x-ray or extreme ultraviolet radiation from a discharge created plasma, said method comprising:
   activating an electrical circuit for generating a pulse that pre-ionizes a selected lasing material within a capillary, said capillary having a length-to-diameter ratio of 20 to 1,000, and said capillary having first and second ends terminating the length;
   providing a high voltage to an excitation circuit having a plurality of electrically conducting structures separated by a liquid dielectric and in electrical communication with electrodes adjacent said first and second ends, respectively;
   switching a fast electrical switch to connect said electrically conducting structures to said electrodes for generating a high voltage drop across said capillary, thereby achieving a high current pulse through said capillary;
   generating a plasma volume within said capillary for creating soft x-ray/extreme ultraviolet radiation; and
   emitting said soft x-ray/extreme ultraviolet radiation from said capillary.

10. The method of claim 9, further including a step of evacuating said capillary prior to filling the capillary with the selected lasing material, and prior to performing said step of switching the fast electrical switch.

11. The method of claim 9 wherein said lasing material comprises a gas or a vapor, said lasing material made to flow through said capillary.

12. The method of claim 9 wherein said step of generating the plasma is achieved by one of: a collisional electron excitation of a laser upper level, and population inversions created by collisional electron-ion recombination.

13. The method of claim 9 wherein said lasing material comprises a neon-like ion.

14. The method of claim 9 wherein said lasing material comprises a nickel-like ion.

15. The method of claim 9 wherein said lasing material comprises a neodymium-like ion.

16. The method of claim 9 wherein said laser material comprises a hydrogen-like ion.

17. The method of claim 9 wherein said laser material comprises a lithium-like ion.

18. The method of claim 9 wherein said laser material comprises a sodium-like ion.

19. The method of claim 9 wherein said radiation is further amplified by multiple passes through the plasma volume.

20. The method of claim 9 wherein said liquid dielectric is selected from the group consisting of: water, ethylene glycol, alcohol and oil.

* * * * *